Nov. 7, 1939.  E. G. STAUDE  2,179,236
POWER MEANS FOR AUTOMOTIVE ACCESSORY ACTUATION
Filed Sept. 24, 1935  4 Sheets-Sheet 1
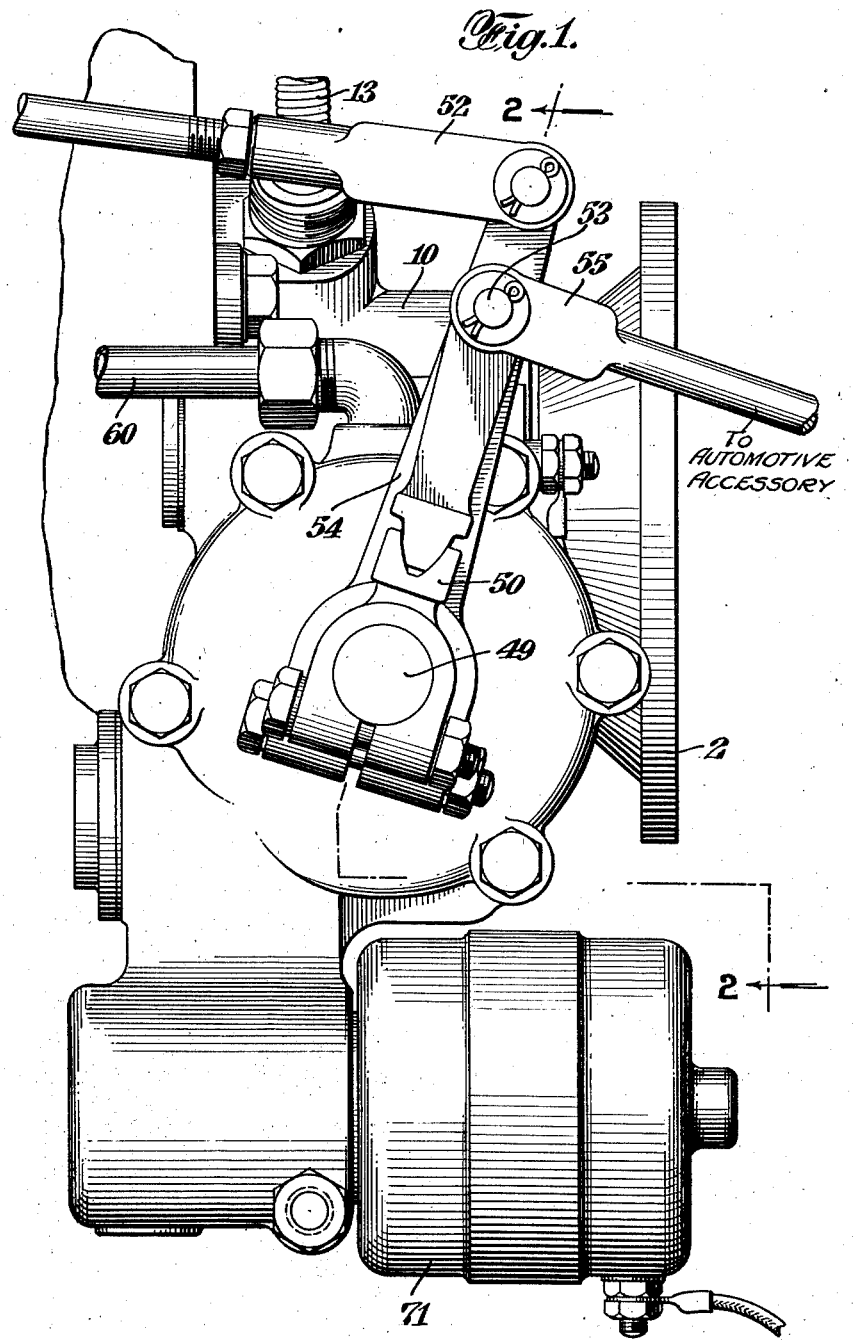
INVENTOR
Edwin G. Staude
BY
Arthur Wright
ATTORNEY

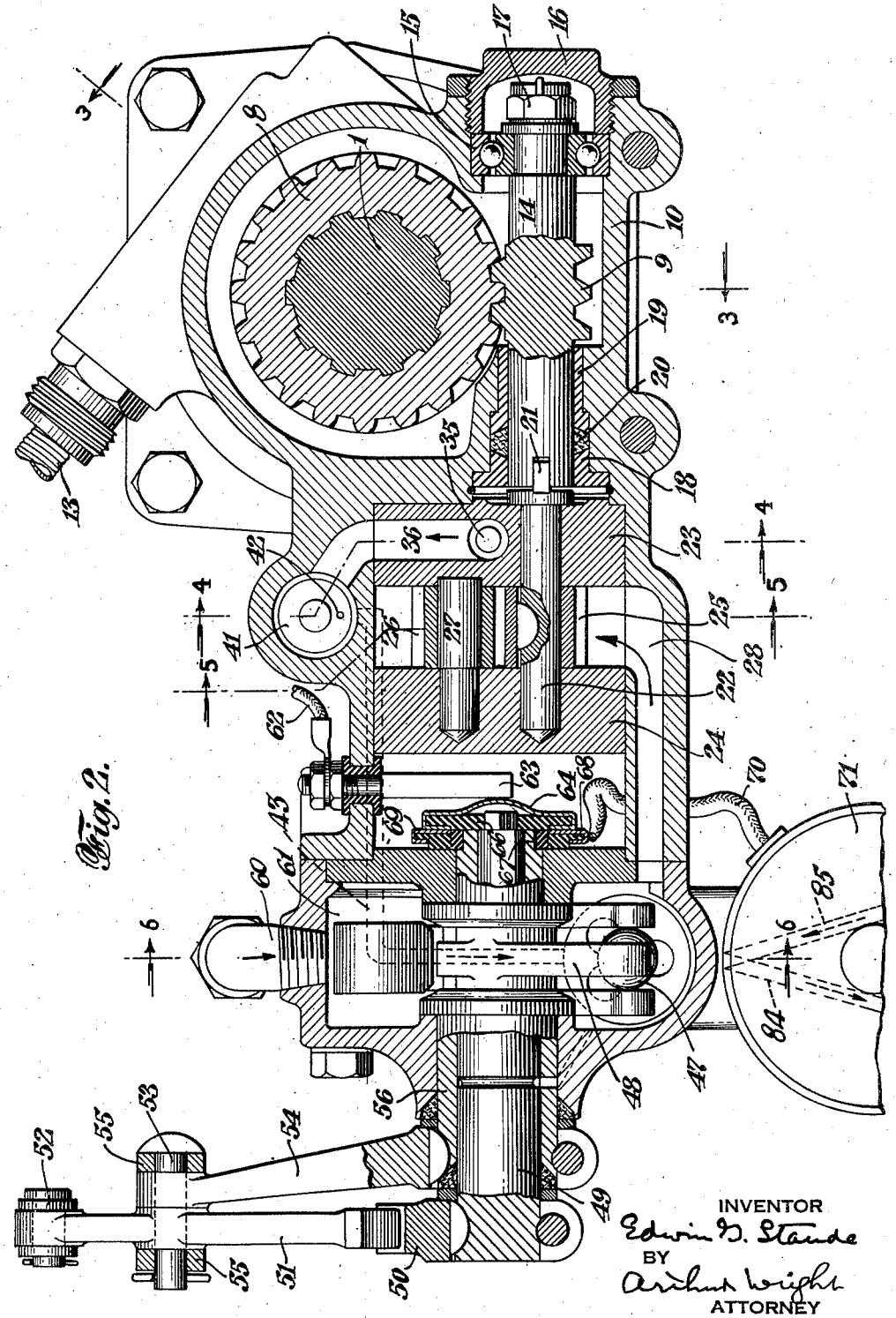

Nov. 7, 1939.  E. G. STAUDE  2,179,236
POWER MEANS FOR AUTOMOTIVE ACCESSORY ACTUATION
Filed Sept. 24, 1935  4 Sheets-Sheet 3
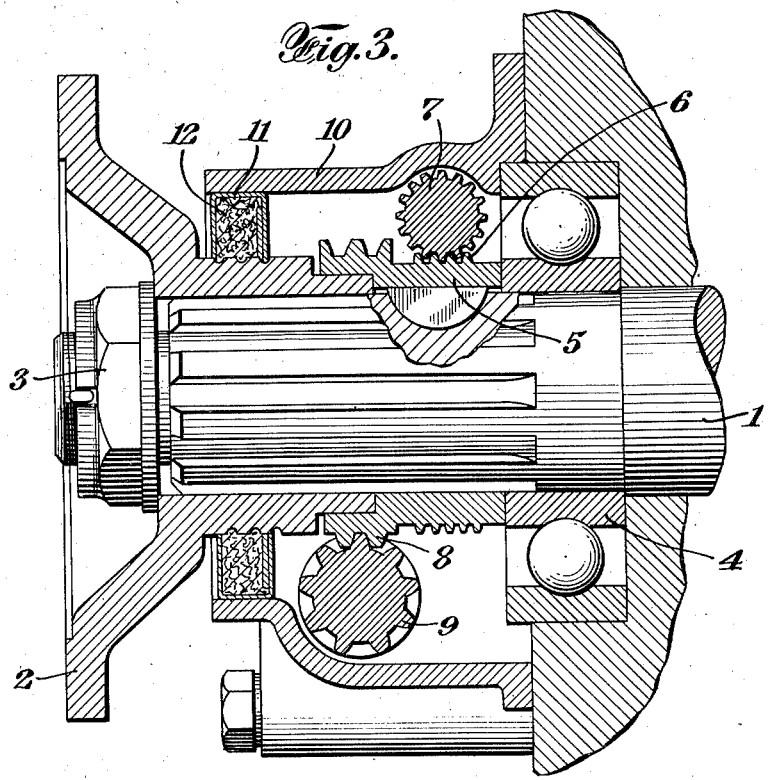
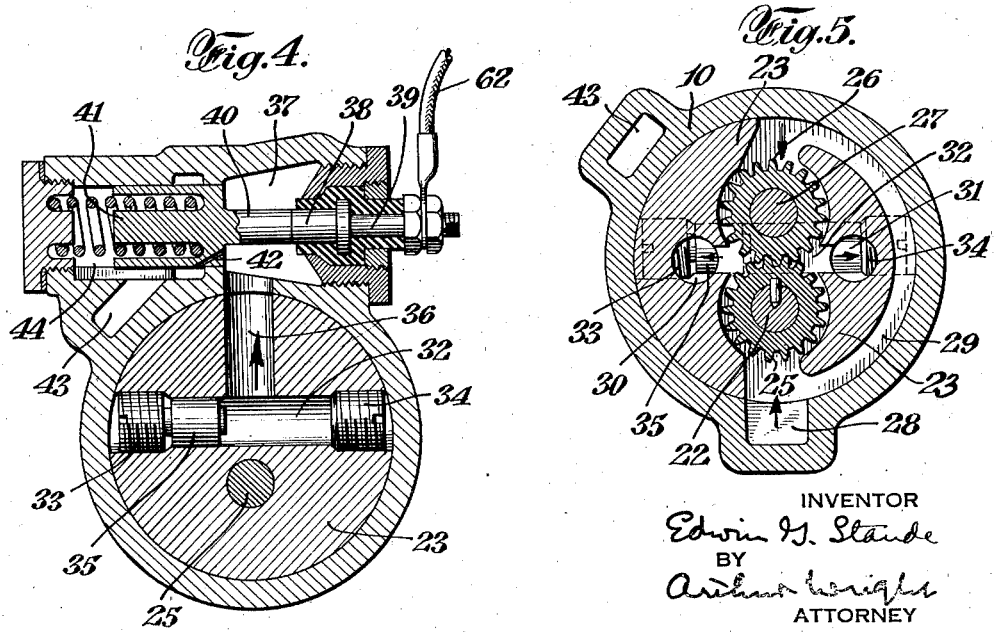
INVENTOR
Edwin G. Staude
BY
Arthur Wright
ATTORNEY

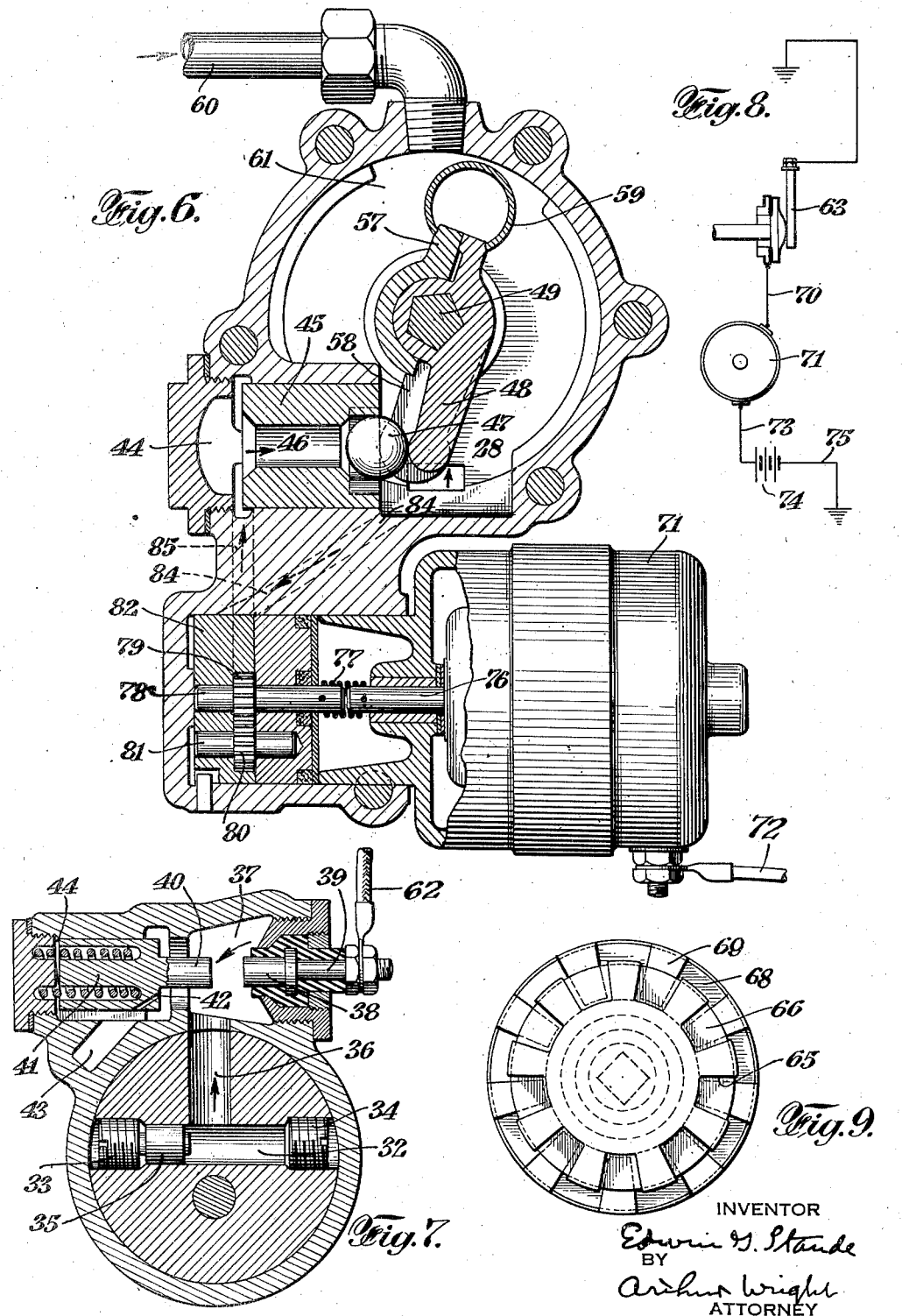

Patented Nov. 7, 1939

2,179,236

UNITED STATES PATENT OFFICE 2,179,236

POWER MEANS FOR AUTOMOTIVE ACCESSORY ACTUATION

Edwin G. Staude, Minneapolis, Minn.

Application September 24, 1935, Serial No. 41,954

15 Claims. (Cl. 188—152)

My invention relates particularly to means adapted to supply power for automotive accessory actuation and has relation, for example, to the actuation of automobile brakes or clutches, or both, or any other power actuated automotive accessory.

The object of my invention is to provide a system whereby power is provided for the actuation of automotive accessories, and which is dependable under the different conditions of automotive operation. A further object is to provide power for the accessory operation, even when the automotive vehicle has stopped or is slowing down. More particularly, the object is to provide a source of power for accessory operation which is normally used for the control of the accessory actuation, and in addition thereto an auxiliary source of power which may be brought into action only when the first-mentioned source of power is partly or wholly ineffective due to the slowing down or stopping of the automotive vehicle. Another object is to provide an electric switch construction which may be used for the actuation of the auxiliary source of power, which is brought into action at the time when the vehicle is slowing up or has been brought to rest. Again, a further object is to provide such a switch which is submerged in oil so as to be sure of its dependable and effective operation when needed at any time and which can be controlled by the pressure in any desired liquid. Further objects of my invention will be seen from the detailed description of the same hereinafter.

While my invention is capable of embodiment in many different forms, for the purpose of illustration I have shown only one form of the same in the accompanying drawings, in which—

Fig. 1 is a side elevation of an apparatus made in accordance with my invention;

Fig. 2 is a transverse section thereof taken on line 2—2 of Fig. 1;

Fig. 3 is a longitudinal section of the same taken on line 3—3 of Fig. 2;

Fig. 4 is another longitudinal section taken on line 4—4 of Fig. 2, showing the plunger switch in closed position;

Fig. 5 is a further longitudinal section taken on line 5—5 of Fig. 2;

Fig. 6 is a side elevation partly in section, of the same;

Fig. 7 is a sectional view of the same as shown in Fig. 4, except that it shows the plunger switch in open position;

Fig. 8 is a diagrammatic representation of the circuit arrangement in the apparatus; and Fig. 9 is an elevation of the pedal operated switch contact.

In the drawings, I have shown the usual transmission shaft 1 on which there is splined a flanged sleeve 2 for transmitting the power to the propeller shaft and which is held in place by a nut 3. The transmission shaft 1 is carried in the usual ballbearing 4 and between the latter and the flanged sleeve 2 there is a gear-sleeve 5, also splined on the shaft 1 on which there is a worm 6 for driving a speedometer shaft gear 7 and a worm 8 for driving a pump gear 9. The gears 7 and 9 are contained within a pump housing 10, one end of which is closed by a ring 11 having a packing 12 within the same. As shown in Fig. 2, the speedometer gear 7 is carried on a flexible speedometer shaft 13. Also, the pump gear 9 is carried by a shaft 14 having at the shouldered end of the shaft a ballbearing 15 which is held in place by a screw cap 16 covering the end of the shaft 14, which is provided with a nut 17 to retain the shaft 14 in position. The sleeve bearing 18, 19, containing a packing 20, supports the other end of said shaft within the pump casing 10. The end of the shaft 14 is slotted to receive a T-shaped projection 21 on a shaft 22 carried within circular pump members 23 and 24, said shaft 22 having splined thereon a pumping gear 25 which meshes with another pumping gear 26 on a stub shaft 27. The oil for the pump, which is comprised of the gears 25 and 26, is supplied thereto through a passageway 28 in the pump casing 10, the same having a branch passageway 29 leading around to the opposite side of the pump gears 25 and 26. This arrangement is provided in order to enable the oil to be pumped, no matter what the direction of rotation of the gears 25 and 26 may be. For this purpose two outlet passageways are provided, 30 and 31, which respectively communicate with the opposite ends of a passageway 32 in the member 24, the two ends of which are closed by screw-plugs 33 and 34 and which has a sliding plunger 35 which moves to one end or the other of the passageway 32 in the direction of the incoming oil so as to close off the other passageway temporarily. The oil leaves the passageway 32 by a vertical passage 36 and enters a switch chamber 37 having at one side thereof a stationary contact 38 having a connecting post 39. In the chamber 37 there is a movable contact 40 on a spring-pressed plunger 41, said plunger having a by-pass passageway 42 adapted to convey the oil back by a passageway 43 to a chamber 44. It will be noted that when the plunger 41 is pressed backwardly against the action of its spring the plunger clears the side of the passageway 43 so that the oil in that position does not have to pass through the by-pass port 42. The oil which is received in the passageway 44 presses against the rear face of the plunger 45 having a central port 46, one end of which is adapted to be more or less closed by a valve 47 adapted to be moved by a lever 48 on a pedal-operated shaft 49. On the outer end of said shaft 49 there is a notched arm 50 which is adapted to be moved by a lever 51 connected by a link 52 to a pedal located in the floor-board of the automobile in the usual way. Said lever 51 is carried on a pivot pin 53 which is located in the end of a lever 54 for applying additional power for the operation of any desired automobile accessory, as, for example, the brake or the clutch of the automobile. For this purpose a link 55 leads from the pivot pin 53 to the usual automobile brake actuating linkage of any desired type, although, instead, the link 55 may lead to any desired type of brake or clutch operating linkage. The said lever 54 is tight on a sleeve 56, located on the shaft 49, and said sleeve 56 has an extension 57 passing around one side of the lever 48 for rotary movement relative thereto. The said sleeve 49, furthermore, has a depending lever 58 which bears against the face of the plunger 45. A circular leaf-spring 59 connects the inner end of the lever 48 with a part of the extension 57 so as to normally retain the levers 48 and 58 in substantial alignment. Oil for the pumping system is supplied from a pipe 60 to a main oil chamber 61 from the low pressure side of the oil filter in the lubricating system of the internal combustion engine provided for driving the automobile. In this way oil is circulated by the pump comprising the gears 25 and 26, irrespective of the direction of rotation thereof, upwardly through the passageway 36 and through the by-pass 42, or if the contacts 38 and 40 are open, then around the end of the plunger 41, thence through the passageway 43 to the chamber 44 and the central passage 46 past the ball-valve 47 to the chamber 61. By pressing upon the foot pedal connected to the link 52 to an increasing extent the ball-valve 47 will increasingly restrict the circulation of the oil through the passageway 46 into the chamber 61 and thus the pressure will build up accordingly on the rear face of the plunger 45, thus increasing the pressure of said plunger 45 upon the lever 58 so as to thus supply an increasing force to the lever 54 which is added to the manual force applied to the brake or clutch by the rod 55.

In case the vehicle is slowing down or is at rest, the circulation of the oil by the pump gears 25 and 26 will become slower or will decrease altogether, thus lowering the pressure in the circulation of oil in the switch chamber 37 at the point where contact will be made between the contacts 38 and 40. The contact 38 is connected by the terminal 39 to a wire 62 which leads to a stationary contact arm 63 which contacts at all times with a rotary contact member 64 having radial cutouts 65 therein which leave exposed an insulating supporting disk 66 carried on the inner end of the shaft 49. Beneath the disk 66 there is an insulating washer 67 around which there is carried a stationary circular insulating supporting member 68 having bent around the edge of the same a plurality of radial conducting arms or tongues 69. A wire 70 connects the stationary contacting member 69 to an electric motor 71, the other terminal of said motor, 72, being connected by a wire 73 to an automobile battery 74. The other terminal of the battery 74 is connected by a wire 75 to the ground, that is to say the automobile engine. Also, it will be noted that the contact plunger 41 is likewise grounded, being carried within parts connected to the engine. In other words, when the rod 52 is moved by the foot pressure upon the pedal the switch 64, 69, will complete the circuit therethrough, and if the pressure of the oil in the switch chamber 37 is high, due to the circulation of the oil by the gears 25 and 26, the switch, comprises of the contacts 38 and 40, will remain broken and the electric motor 71 will not be actuated. When, however, the pressure of the oil in the switch chamber 37 falls to a low point and while the foot pressure is being applied to the rod 52, the electric motor 71 will be actuated so that a motor shaft 76 will drive by means of a spiral spring drive connection 77 an auxiliary pump shaft 78 having a pump gear 79 thereon which meshes with another pump gear 80 on a shaft 81, said shafts 78 and 81 being carried by circular pump members 82 and 83 which, together with the gears 79 and 80, form a one-way circulating pump, that is to say, with an oil inlet passageway 84 carried in the pump casing which forms the housing for the gears 79 and 80 as well as the circular pump members 82 and 83, said passageway leading from the oil chamber 61 to a point in the circular member 82 at one side and between the gears 79 and 80 while an outlet passageway 85 is provided in the circular member 82 and leading from the midway point of the opposite side of said gears 79 and 80 outwardly through the pump casing 10 to the chamber 44.

In the operation of the apparatus, any desired automobile accessory may be controlled by the application of power thereto, in accordance with my apparatus, as, for example, a brake or a clutch, or both, but, for example, in the operation of a brake therewith it will be assumed that the automobile is in operation and moving and that it is desired to apply the brakes to the wheels thereof. To apply the brakes, therefore, the foot pedal will be pressed downwardly, thus moving the rod 52 in the direction of the arrow, thereby applying a manual movement to the rod 55 which will start to bring the automobile brakes into action and continued forward movement of the rod 52 by the foot pedal will apply a certain amount of manual pressure to the brakes. However, this continued movement of the foot pedal will move the ball valve 47 inwardly to some extent, thus constricting the circulation of the oil which is flowing through the passageway 46 by reason of the rotation of the pump gears. This constriction of the circulation of the oil through the passageway 46 will cause the pressure to build up in the chamber 44 at the rear of the plunger 45, thus causing the plunger 45 to press upon the end of the lever 58 which will be moved in this way to an increasing extent, according to the downward movement of the foot upon the pedal, so that the greater the depression of the foot pedal the greater the force supplied to the brakes from the lever 54 due to the oil pressure. Should the automobile slow down considerably, or come to rest, the pump gears 25 and 26 will cease to provide enough pressure, due to the decrease of the oil pressure in the chamber 37 so that, as a result, the switch, comprised of the contacts 38 and 40, will be closed. It will be understood, also, that the initial depression of the pedal has already closed the rotary switch 64 and 69 as this switch is open only when the foot pedal is released. As a result, the auxiliary pumping means, comprised of the gears 79 and 80, will come into action by the movement of the motor 71 so that circulating oil will be provided from this source, also passing through the passageway 46 and the constriction of which, according to the position of the manually moved ball valve 47, will bring into action the corresponding amount of auxiliary pressure on the brakes by reason of the corresponding movement of the lever 58.

While I have described my invention above in detail I wish it to be understood that many changes may be made therein without departing from the spirit of the same.

I claim:

1. In combination, an automotive vehicle, an accessory thereon, a manual control means therefor, a source of power derived from and coordinated to the movement of the vehicle whenever the vehicle is in motion from its own traction on a road for operating the accessory adapted to be brought into action by the movement of the manual control means, and an auxiliary source of power for operating the accessory adapted to be rendered active upon the decreasing effectiveness of the power derived from the movement of the automobile.

2. In combination, an automotive vehicle, an accessory thereon, a manual control means therefor, a source of power derived from and coordinated to the movement of the vehicle whenever the vehicle is in motion from its own traction on a road for operating the accessory adapted to be brought into action by the movement of the manual control means, and an electrically driven auxiliary source of power for operating the accessory adapted to be rendered active upon the decreasing effectiveness of the power derived from the movement of the automobile.

3. In combination, an automotive vehicle, an accessory thereon, a manual control means therefor, a source of power derived from and coordinated to the movement of the vehicle whenever the vehicle is in motion from its own traction on a road for operating the accessory adapted to be brought into action by the movement of the manual control means, an electrically driven auxiliary source of power for operating the accessory adapted to be rendered active upon the decreasing effectiveness of the power derived from the movement of the automobile, and a controlling switch for the electrically driven source of power operable by said manual means.

4. In combination, an automotive vehicle, an accessory thereon, a manual control means therefor, a source of power derived from and coordinated to the movement of the vehicle whenever the vehicle is in motion from its own traction on a road for operating the accessory adapted to be brought into action by the movement of the manual control means, an electrically driven auxiliary source of power for operating the accessory adapted to be rendered active upon the decreasing effectiveness of the power derived from the movement of the automobile, and a controlling switch for the electrically driven source of power operable by said manual means.

5. In combination, an automotive vehicle, an accessory thereon, a manual control means therefor, a source of power derived from and coordinated to the movement of the vehicle whenever the vehicle is in motion from its own traction on a road, comprising a liquid circulating pump, for operating the accessory, adapted to be brought into action by the movement of the manual control means, an electrically driven auxiliary source of power for operating the accessory, adapted to be rendered active upon the decreasing effectiveness of the power derived from the movement of the automobile, a controlling switch for the electrically driven source of power operable by said manual means, and a switch for said electrically driven source of power, adapted to be brought into action by the decrease of the pressure of the liquid.

6. In combination, an automotive vehicle, an accessory thereon, a manual control means therefor, a source of power derived from and coordinated to the movement of the vehicle whenever the vehicle is in motion from its own traction on a road, comprising a liquid circulating pump, for operating the accessory, adapted to be brought into action by the movement of the manual control means, and an auxiliary source of power for operating the accessory, adapted to be rendered active upon the decreasing effectiveness of the power derived from the movement of the automobile.

7. In combination, an automotive vehicle, an accessory thereon, a manual control means therefor, a source of power derived from and coordinated to the movement of the vehicle whenever the vehicle is in motion from its own traction on a road, comprising a liquid circulating pump, for operating the accessory, adapted to be brought into action by the movement of the manual control means, an auxiliary source of power for operating the accessory, adapted to be rendered active upon the decreasing effectiveness of the power derived from the movement of the automobile, and a device for bringing said auxiliary source of power into action upon the decrease of the pressure of the liquid.

8. In combination, an automotive vehicle, a brake thereon, a manual control means therefor, a source of power derived from and coordinated to the momentum of the vehicle whenever the vehicle is in motion from its own traction on a road for operating the brake, adapted to be brought into action by the movement of the manual control means, and an auxiliary source of power for operating the brake, adapted to be rendered active upon the decreasing effectiveness of the power derived from the momentum of the automobile.

9. In combination, an automotive vehicle, a clutch thereon, a manual control means therefor, a source of power derived from and coordinated to the momentum of the vehicle whenever the vehicle is in motion from its own traction on a road for operating the clutch, adapted to be brought into action by the movement of the manual control means, and an auxiliary source of power for operating the clutch, adapted to be rendered active upon the decreasing effectiveness of the power derived from the momentum of the automobile.

10. In combination, an automotive vehicle, an accessory thereon, an oil submerged switch comprising contacts, one of which is movable, a body of circulating oil in which the contacts are carried, means for separating the contacts upon an increase of oil pressure, and an oil circulating pump for delivering the said body of oil to the switch and to the accessory for operating the latter.

11. In combination, an automotive vehicle, an accessory thereon, an oil submerged switch comprising contacts, one of which is movable, a body of circulating oil in which the contacts are carried, means for separating the contacts, including a spring support for the movable contact, upon an increase of oil pressure, and an oil circulating pump for delivering the said body of oil to the switch and to the accessory for operating the latter.

12. In combination, an automotive vehicle, an accessory thereon, an oil submerged switch comprising contacts, one of which is movable, a body of circulating oil in which the contacts are carried, means for separating the contacts upon an increase of oil pressure, and an oil circulating pump for delivering the said body of oil to the switch and to the accessory for operating the latter, said movable contact being a port-controlling plunger for the circulating oil.

13. In combination, an automotive vehicle, an accessory thereon, an oil submerged switch comprising contacts, one of which is movable, a body of circulating oil in which the the contacts are carried, means for separating the contacts, including a spring support for the movable contact, upon the increase of the pressure of the oil, and an oil circulating pump for delivering the said body of oil to the switch and to the accessory for operating the latter, said movable contact being a port-controlling plunger for the circulating oil.

14. In combination, an automotive vehicle, an accessory thereon, an oil submerged switch comprising contacts, one of which is movable, a body of circulating oil in which the contacts are carried, means for separating the contacts upon the increase of the pressure of the oil, and an oil circulating pump for delivering the said body of oil to the switch and to the accessory for operating the latter, said movable contact being a port-controlling plunger for the circulating oil, said plunger having a passageway for the normal by-pass of the oil during circulation.

15. In combination, an automotive vehicle, an accessory thereon, an oil submerged switch comprising contacts, one of which is movable, a body of circulating oil in which the contacts are carried, means for separating the contacts, including a spring support for the movable contact, upon the increase of the pressure of the oil, and an oil circulating pump for delivering the said body of oil to the switch and to the accessory for operating the latter, said movable contact being a port-controlling plunger for the circulating oil, said plunger having a passageway for the normal by-pass of the oil during circulation.

EDWIN G. STAUDE.